United States Patent [19]

Toth

[11] 4,430,551

[45] Feb. 7, 1984

[54] SEMI-AUTOMATIC CONTROL AND METHOD FOR MIG WELDING

[75] Inventor: Tibor E. Toth, Florence, S.C.

[73] Assignee: Union Carbide Corporation, Danbury, Conn.

[21] Appl. No.: 348,346

[22] Filed: Feb. 12, 1982

[51] Int. Cl.³ .............................................. B23K 9/10
[52] U.S. Cl. ............................. 219/132; 219/137.71; 219/137 R
[58] Field of Search ............. 219/132, 137.71, 137 R; 340/825.57, 825.63

[56] References Cited

U.S. PATENT DOCUMENTS

| 2,515,968 | 7/1950 | Shanklin | 340/825.63 |
| 3,581,051 | 5/1971 | Brown | 219/132 |
| 4,283,618 | 8/1981 | Jakob | 219/132 |

Primary Examiner—C. C. Shaw
Attorney, Agent, or Firm—Eugene Lieberstein

[57] ABSTRACT

A method for controlling selected switching between preset welding schedules in a MIG welding operation, in response to operation from a single control switch having only on and off signal selections.

4 Claims, 2 Drawing Figures

SEMI-AUTOMATIC CONTROL AND METHOD FOR MIG WELDING

This invention relates to a welding control and method for inert gas shielded ard (MIG) welding to enable the operator to switch between preset welding schedules without interrupting the welding operation.

It has become conventional in MIG welding to provide the welding operator with the flexibility of readily alternating between preset welding parameters of for example, wire feed speed, arc voltage and shielding gas from that of a first preset schedule of such parameters to a second preset schedule in response to changes in fit up conditions existing at the workpiece. This enables the operator to quickly switch between such preset schedules without interrupting the welding operation. In the past this has been accomplished using separate torch switches for each desired preset welding schedule or by using a multiple position switch with each position identifying a different preset schedule. The use of such special torch switches has proved awkward and cumbersome causing the operator to either take his mind off the welding operation for a short period of time or to terminate the weld to undertake the switching operation.

It is, therefore, the principal object of the present invention to provide a dual schedule welding control and method for controllably switching between preset welding schedules in response to a signal from a single control switch having only "on" and "off" signal selections.

It is another object of the present invention to provide a dual schedule welding control and method for controllably switching between preset welding schedules without interruption of the welding operation in response to a control signal from a standard "on"-"off" welding contact switch.

Figure 1:
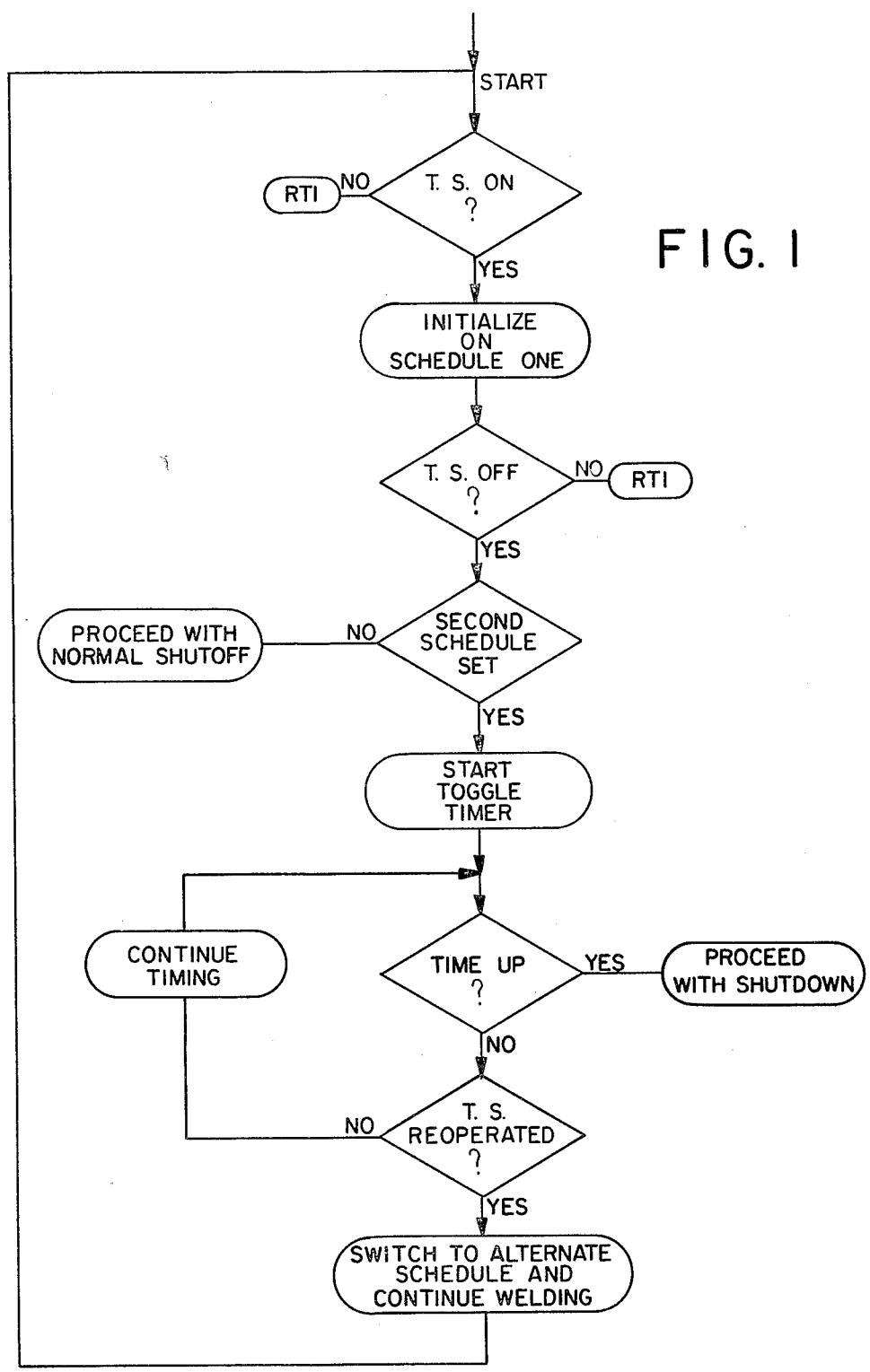
Figure 2:
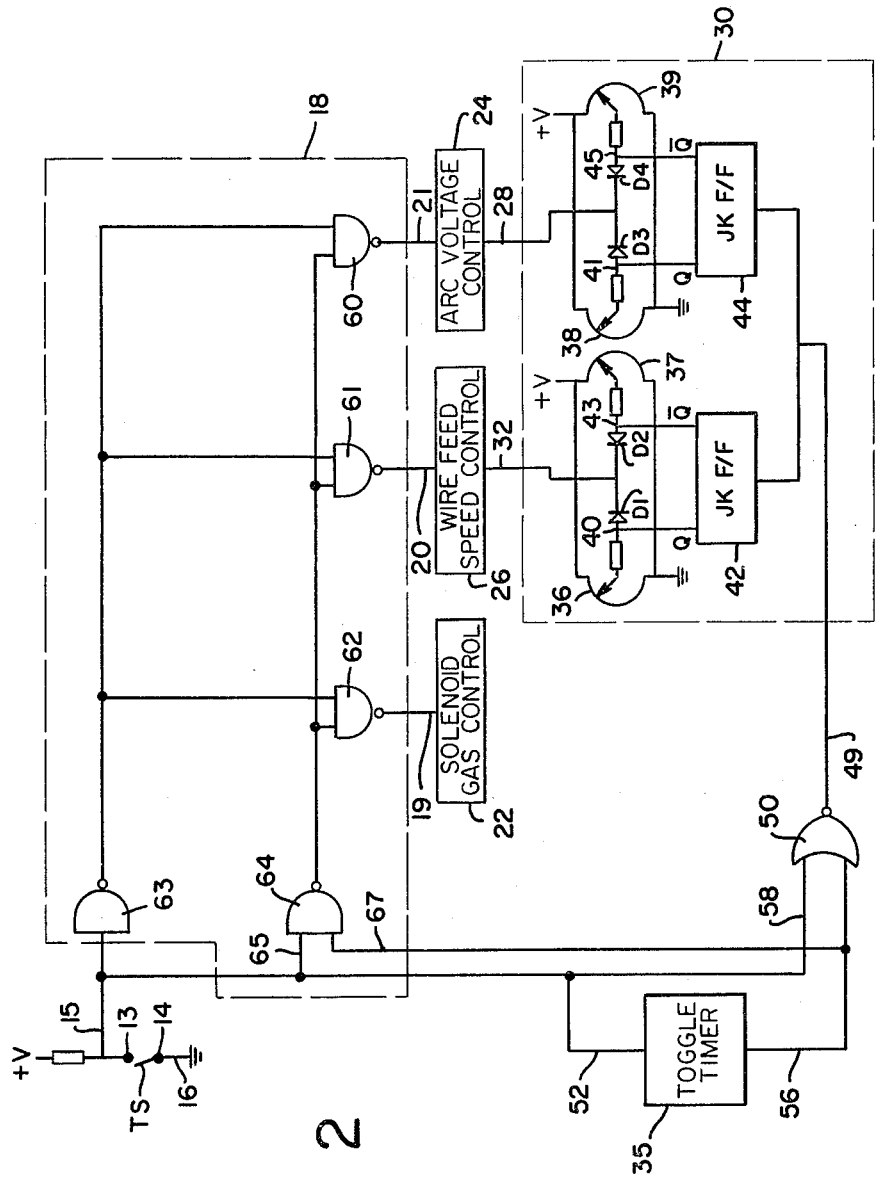

Other objects and advantages of the present invention will become apparent from the following detailed description of the invention when read in conjunction with the accompanying drawings of which:

FIG. 1 is a flow chart and block diagram of the welding control of the present invention; and FIG. 2 is a schematic hard wired circuit diagram of an illustrative example of a welding control for practicing the present invention.

FIG. 1 is a flow chart and block diagram of the welding control of the present invention. It should be understood that any conventional microprocessor may readily be programmed to perform the program routines identified in the flow chart of FIG. 1. Alternatively the method and control of the present invention may be practiced using a hard wired electronic circuit as illustratively embodied in the circuit schematic of FIG. 2.

In accordance with the flow chart of FIG. 1 the condition of "toggle switch on" represents the start of the program or program subroutine for carrying out the method of the present invention. This condition corresponds to the manual placement of a standard welding toggle switch "TS" in the on position. If the toggle switch TS is not in the on position the program will return through interrupt to perform other tasks as is typical to most standard programs. Upon the next reiteration the state of the toggle switch TS will again be reevaluated. Once the toggle switch is identified as being in the on position a first preset welding schedule is initialized. This establishes a first set of welding parameters for shielding gas, wire feed speed and arc voltage respectively. The initialization occurs by generating appropriate output control signals corresponding to the first preset schedule of welding parameters. The control signals operate to enable the gas solenoid control (not shown) to deliver shielding gas to the MIG torch (not shown); to enable the wire feed speed control for delivering electrode wire through the MIG torch and to enable the welding power supply (not shown) to impress arc voltage across the electrode to workpiece. A gas solenoid control, wire feed speed control and welding power supply are standard and conventional equipment to a MIG welding set up and are referred to in connection with the FIG. 2 embodiment.

Upon initializing at the first preset schedule of welding parameters the state of the toggle switch TS is again evaluated. As long as the toggle switch TS remains "on", i.e., closed, the first preset schedule of parameters remains operational and the program recycles itself through interrupt. If the toggle switch is turned "off", i.e., released or opened, a determination is made as to whether a second schedule of parameters is set, i.e., is there a second set of parameters, and, if not, a conventional welding shut down procedure is initiated. Welding shut down is a conventional procedure involving disabling the gas solenoid, applying the dynamic brake to stop the rotation of the wire feed motor and disabling the power supply.

If a second schedule of parameters had been set, a timing operation is initiated to introduce a predetermined time delay before switching to the second schedule of parameters. The timing operation involves enabling a software timer to count down for a specific predetermined period of, for example, 200 milliseconds. If during such time period the toggle switch TS has not been reoperated the normal welding shut down precedure is again initiated. If during such time period the toggle switch TS has been reoperated, i.e., closed to reestablish the "on" state within the count down time period, the second schedule of welding parameters is substituted for the first schedule of welding parameters.

The program identified by the flow chart of FIG. 1 is in a closed loop such that evulation of the state of the toggle switch is continuously repeated. Once in the second preset schedule the operator can easily and readily revert back to the first preset schedule by reopening and closing the toggle switch within the preselected toggle timer period without interrupting the welding operation. In the same fashion, the operator can again switch the second preset schedule of parameters. The switching operation occurs each time a reoperation of the toggle switch occurs within the set time period.

FIG. 2 is an illustrative example of an electrical circuit for controllably switching between a first and second preset schedule of welding parameters in accordance with the present invention and in conformity with the flow diagram of FIG. 1.

In FIG. 2 the toggle switch TS is a standard single pole single throw switch which is preferably built into the torch handle for the operator to activate by simply depressing the switch and to deactivate by simply releasing the switch. Depressing the toggle switch TS closes contacts 13 and 14 thereby shorting leads 15 and 16. Releasing the toggle switch TS breaks open the contacts 13 and 14 imposing a positive potential or logical high on lead 15. The toggle switch TS is in a normally open position. When the toggle switch TS is closed the input/output "I/O" gate control 18 will apply enable signals 19, 20, and 21 to the gas solenoid control 22, the power supply arc voltage control 24, and the wire feed speed control 26.

Enabling the gas solenoid control 22 will cause shielding gas to flow into the MIG torch (not shown) in a standard and conventional manner which does not form a part of the present invention. Likewise, the enable signal 21 energizes the power supply arc voltage control 22 which in turn controls and regulates the arc voltage impressed across the electrode to workpiece in response to an input signal 28 from the schedule selection circuit 30. The arc voltage will be regulated at a level corresponding to the DC magnitude of the input signal 28. The power supply arc voltage control regulates the arc voltage in a conventional manner which does not form a part of the present invention. A typical power supply arc voltage control circuit which will respond to a DC control signal is shown and described in U.S. Pat. No. 3,781,640 issued to applicant on Dec. 25, 1973, the disclosure of which is hereby incorporated by reference. The wire feed speed control 26 is also a conventional control for governing the rate at which a wire electrode (not shown) is fed through a MIG torch. The wire feed rate is proportional to the DC magnitude of the input signal 32 from the schedule selection circuit 30. A typical full wave governor control circuit for driving a wire electrode feed motor at a constant rate proportional to a DC input signal is shown and described in U.S. Pat. No. 3,781,620 issued to Applicant on Dec. 25, 1973, the disclosure of which is hereby incorporated by reference.

The schedule selection circuit 30 applies input signals 28 and 32 to the arc voltage power supply control 24 and to the wire feed speed control 26. The input signals 28 and 32 define either a first or second preset welding schedule of voltage and wire feed speed conditions dependent upon the state of the toggle switch TS and the condition of a toggle timer 35.

The welding parameters for each schedule is preset by manual adjustment of the dual set of potentiometers 36, 37 and 38, 39. The set of potentiometers 36 and 37 form a first switching circuit in combination with a J-K flip-flop 42 while the set of potentiometers 38 and 39 form a second switching circuit in combination with the J-K flip-flop 44. The output 40 from potentiometer 36 and the output 41 of potentiometer 38 represents in combination with control of the gas solenoid the first preset welding schedule of welding parameters whereas the output 43 from potentiometer 37 and the output 45 of potentiometer 39 in the second switching circuit represent in combination with the gas solenoid the second preset welding schedule of welding prameters.

The schedule selection circuit 30 automatically reverts from an operating condition in which the first preset welding potentiometer outputs 40 and 41 are enabled to the opposite operating condition with the second preset welding potentiometer outputs 43 and 45 enabled. The switching operation occurs in response to a change in the logical state of the J-K flip-flops 42 and 44. Thus potentiometers 36 and 38 provide the first schedule of welding parameters whereas potentiometers 37 and 39 provide the second schedule of welding parameters.

Each pair of potentiometers 36 and 37 and potentiometers 38 and 39 are tied in parallel across of a source of potential V and ground potential. The wiper arms of the pair of potentiometers 36 and 37 are connected through diodes D1 and D2 to the common output lead 32. The outputs 40 and 43 of potentiometers 36 and 37 are connected to the alternate outputs Q and Q of the J-K flip-flop 42. The output state not Q is normally low with diodes D1 and D3 forward biased and diodes D2 and D4 reversed biased. Likewise, the wiper arms of the pair of potentiometers 38 and 39 are connected through diodes D3 and D4 to the common output lead 28. In addition, the outputs 41 and 45 of the potentiometers 38 and 39 are connected to the alternate outputs Q and Q of the J-K flip-flop 44.

The state of each flip-flop 42 and 44 is controlled by the output 49 of the NOR gate 50 which, in turn, is responsive to the position of the toggle switch TS and the toggle timer 35. The toggle timer 35 is a standard and conventional logic timer which is activated in response to a logical reversal in signal level from that of a logical low to a logical high on its input lead 52. This occurs only upon the release of the toggle switch TS. At all other times the output 56 of the toggle timer 35 is a logical high. Accordingly, until the toggle switch TS is closed and then reopened the toggle timer 35 will remain deactivated and the output 56 will be high. With the output 56 high, the output 49 of the NOR gate 50 is a logical low. The J-K flip-flops 42 and 44 in the schedule select circuit 30 will reverse state only when the output 49 of NOR gate 50 is complemented to the logical high state.

When the toggle switch TS is in the closed position and is then opened the toggle timer 35 is activated. The timer 35 will automatically provide a logical low on output 56 for any given predetermined time period of, for example, 200 milliseconds after which time the output 56 reverts back to its normal logical high state. During this predetermined time period the NOR gate 50 will complement its output 49 and go high provided its other input 58 is low. The input 58 is low only when the toggle switch TS is closed. Accordingly, the toggle switch TS must be reoperated after the timer is activated and within the time out period for the NOR gate 50 to complement its output 49. Once the output 49 is complemented, the J-K flip-flops 42 and 44 reverse state and the operating schedules are switched from schedule 1 to schedule 2.

In operation with the toggle switch TS open the outputs 19, 20 and 21 of the I/O gate control 18 are disabled. The I/O gate control 18 includes a plurality of Nand gates 60, 61, 62, 63 and 64. Nand gate 64 has one input lead 65 connected to the toggle switch lead 15 and a second input lead 67 connected to the output 56 of the toggle timer 35. Nand gate 64 assures a shut down condition when the toggle switch TS is open and the toggle timer 35 is deactivated during which time its input leads 65 and 67 are high. When the toggle switch TS is closed, the signal, 19, 20 and 21 from the I/O gate control 18 is enabled. Until the toggle switch TS is released, however, the toggle timer 35 remains disaabled and the output 49 of NOR gate 50 remains low. With the output 49 low the J-K flip-flops 42 and 44 are in a state such that the preset welding schedule one is operational with outputs 40 and 41 enabled. Once the toggle switch TS is released the toggle timer 35 is activated. If the toggle timer 35 is allowed to time out without the operator reoperating the toggle switch TS, the output of Nand gate 64 will go low and normal shut down of the welding operation will occur. If instead, the toggle switch TS is reoperated within the time out period by closing the toggle switch again before the timer period has elapsed both inputs 56 and 58 to NOR gate 50 will be low and its output will complement to cause a transfer from the first preset schedule to the second preset schedule. Repeating the operation of opening the toggle switch TS and reoperating it will again switch the operating welding schedules back to the first preset schedule. This switching between the preset schedules can be repeated continuously.

I claim:

1. In a method of MIG welding in which the energization and deenergization of the welding operation is controlled from a single toggle switch having only a first and second position and in which selected operational parameters of the welding operation such as wire feed speed, arc voltage, and shielding gas are controllably varied between a first preset schedule of welding parameters and a second preset schedule in response to the position of said toggle switch, the improvement comprising:

detecting the state of the toggle switch;

initializing the welding operation using the first preset schedule of welding parameters in response to detection of the second position of the toggle switch;

enabling a timing operation of a predetermined relatively short time duration in response to the detection of the toggle switch in its first position;

detecting a reoperation of the toggle switch within said predetermined time duration for switching from said first preset schedule to said second preset schedule;

deenergizing said welding operation upon the concurrence of said relatively short time duration and the absence of a reoperation of the toggle switch;

repeating said reevaluation of the state of said toggle switch for reenabling said timing operation each time said toggle switch is in the first position and switching between said preset schedules each time said toggle switch is reoperated within the predetermined time duration of said timing operation.

2. In a method of MIG welding as defined in claim 1 further comprising the steps of terminating the welding operation upon expiration of said predetermined time duration in the absence of the detection of a reoperation of the toggle switch.

3. In a method as defined in claim 1 wherein said first position is the open position of the toggle switch and wherein said second position is the toggle switch closed position.

4. A welding control for use in a MIG welding system having a toggle switch with an open position for deenergizing the welding operation and circuit means for generating output signals for controlling predetermined welding parameters such as wire feed speed, arc voltage and shielding gas; said circuit means comprising:

timing means for generating a predetermined logic signal over a predetermined time duration in response to the transfer of said toggle switch from said closed position to said open position;

means for generating a control signal in response to the concurrence of said logic signal and the closed position of said toggle switch; and switching means for varying the magnitude of said output signals between a first predetermined magnitude representing a first preset schedule of welding parameters and a second predetermined magnitude representing a second preset schedule of welding parameters in response to the occurrence of said control signal.

* * * * *

UNITED STATES PATENT AND TRADEMARK OFFICE
CERTIFICATE OF CORRECTION

PATENT NO. : 4,430,551
DATED : February 7, 1984
INVENTOR(S) : Tibor E. Toth

It is certified that error appears in the above-identified patent and that said Letters Patent is hereby corrected as shown below:

Col. 3, line 54, "prameters" should be -- parameters --.

Col. 4, line 58, "disaabled" should be -- disabled --.

Signed and Sealed this

Twenty-fourth Day of July 1984

[SEAL]

Attest:

GERALD J. MOSSINGHOFF

Attesting Officer

Commissioner of Patents and Trademarks